United States Patent
Dang et al.

(10) Patent No.: US 11,817,634 B2
(45) Date of Patent: **\*Nov. 14, 2023**

(54) DYNAMIC EFFECTIVE RADIATED POWER (ERP) ADJUSTMENT

(71) Applicant: GOGO BUSINESS AVIATION LLC, Broomfield, CO (US)

(72) Inventors: Tuan M. Dang, Chicago, IL (US); Sean Scott Cordone, Wheaton, IL (US); Jeff Bruggemann, Lake Zurich, IL (US)

(73) Assignee: GOGO BUSINESS AVIATION LLC, Broomfield, CO (US)

(\*) Notice: Subject to any disclaimer, the term of this patent is extended or adjusted under 35 U.S.C. 154(b) by 109 days.

This patent is subject to a terminal disclaimer.

(21) Appl. No.: 17/471,272

(22) Filed: Sep. 10, 2021

(65) Prior Publication Data
US 2021/0408678 A1    Dec. 30, 2021

Related U.S. Application Data

(63) Continuation of application No. 17/007,212, filed on Aug. 31, 2020, now Pat. No. 11,145,976, which is a (Continued)

(51) Int. Cl.
*H01Q 3/28* (2006.01)
*H04B 7/185* (2006.01)
(Continued)

(52) U.S. Cl.
CPC .............. *H01Q 3/28* (2013.01); *G01C 21/20* (2013.01); *G01S 19/02* (2013.01); *H01Q 3/267* (2013.01);
(Continued)

(58) Field of Classification Search
CPC ............ H01Q 1/28; H01Q 3/28; H01Q 3/267; H01Q 21/29; H01Q 23/00; H01Q 3/2605;
(Continued)

(56) References Cited

U.S. PATENT DOCUMENTS 7,535,419 B2    5/2009  Hurst et al.
7,894,844 B2    2/2011  Hiddink et al.
(Continued)

FOREIGN PATENT DOCUMENTS

CN    102474321 A    5/2012
CN    102710343 A    10/2012
(Continued)

OTHER PUBLICATIONS

Search Report for International application No. PCT/US2017/039625, dated Oct. 5, 2017.
(Continued)

*Primary Examiner* — Olumide Ajibade Akonai
(74) *Attorney, Agent, or Firm* — MARSHALL, GERSTEIN & BORUN LLP; Randall G. Rueth

(57) ABSTRACT

Antennas used aboard vehicles to communicate with satellites or ground stations may have complex antenna patterns, which may vary as the vehicle moves throughout a given coverage area. Techniques are disclosed for dynamically adjusting the instantaneous power fed to an antenna system to ensure that the antenna transmits at the regulatory or coordinated effective isotropic radiated power (EIRP) spectral limit. The antenna may transmit, in accordance with vehicle location and attitude, steerable beam patterns at different scan and skew angle combinations, causing variations in antenna gain and fluctuations in the transmitted EIRP. Using on-board navigational data, an antenna gain and ESD limit may be calculated for a particular scan and skew angle, which may be used to adjust power fed to the antenna
(Continued)

such that the antenna transmits substantially at maximum allowable EIRP as the steerable beam pattern is adjusted.

20 Claims, 4 Drawing Sheets

Related U.S. Application Data continuation of application No. 16/194,741, filed on Nov. 19, 2018, now Pat. No. 10,797,390, which is a continuation of application No. 15/251,078, filed on Aug. 30, 2016, now Pat. No. 10,211,530.

(60) Provisional application No. 62/357,570, filed on Jul. 1, 2016.

(51) Int. Cl.
    *G01C 21/20* (2006.01)
    *G01S 19/02* (2010.01)
    *H01Q 3/26* (2006.01)
    *H04W 16/28* (2009.01)
    *H01Q 1/28* (2006.01)

(52) U.S. Cl.
    CPC ........ *H04B 7/18506* (2013.01); *H04W 16/28* (2013.01); *H01Q 1/28* (2013.01); *H04B 7/18508* (2013.01); *Y02D 30/70* (2020.08)

(58) Field of Classification Search
    CPC . H01Q 3/30; H01Q 3/36; G01S 19/02; H04B 17/21; H04B 17/11; H04B 7/18506; H04B 7/18508; H04W 16/28; G01C 21/20; Y02D 30/70
    See application file for complete search history.

(56) References Cited

U.S. PATENT DOCUMENTS

| | | | |
|---|---|---|---|
| 8,259,005 B1* | 9/2012 | Lam | H01P 1/184 |
| | | | 342/174 |
| 9,787,386 B2* | 10/2017 | Strong | H04B 17/11 |
| 10,211,530 B2 | 2/2019 | Dang et al. | |
| 10,797,390 B2 | 10/2020 | Dang et al. | |
| 2002/0058478 A1 | 5/2002 | de La Chapelle et al. | |
| 2002/0168974 A1 | 11/2002 | Rosen et al. | |
| 2006/0040614 A1 | 2/2006 | Chapelle et al. | |
| 2006/0044182 A1 | 3/2006 | Vacanti | |
| 2006/0049977 A1 | 3/2006 | Vacanti | |
| 2008/0122693 A1 | 5/2008 | Needham et al. | |
| 2010/0248617 A1 | 9/2010 | Law | |
| 2013/0243054 A1 | 9/2013 | Adada et al. | |
| 2013/0271322 A1 | 10/2013 | Harel et al. | |
| 2016/0233580 A1* | 8/2016 | Aparin | H04B 17/13 |

FOREIGN PATENT DOCUMENTS

| | | |
|---|---|---|
| CN | 103296427 A | 9/2013 |
| CN | 104813187 A | 7/2015 |
| CN | 104935370 A | 9/2015 |
| CN | 108535575 A | 9/2018 |
| WO | WO-02/27975 A1 | 4/2002 |
| WO | WO-2013187922 A2 | 12/2013 |

OTHER PUBLICATIONS

Written Opinion for International application No. PCT/US2017/039625, dated Oct. 5, 2017.

Notice of Allowance, U.S. Appl. No. 15/251,078, dated Sep. 28, 2018.

\* cited by examiner

DYNAMIC EFFECTIVE RADIATED POWER (ERP) ADJUSTMENT

CROSS-REFERENCE TO RELATED APPLICATIONS

This application is a continuation of U.S. patent application Ser. No. 17/007,212, entitled "Dynamic Effective Radiated Power (ERP) Adjustment," and filed on Aug. 31, 2020, which is a continuation of U.S. patent application Ser. No. 16/194,741 (now U.S. Pat. No. 10,797,390), entitled "Dynamic Effective Radiated Power (ERP) Adjustment," and filed on Nov. 19, 2018, which is a continuation of U.S. patent application Ser. No. 15/251,078 (now U.S. Pat. No. 10,211,530), entitled "Dynamic Effective Radiated Power (ERP) Adjustment," and filed on Aug. 30, 2016, which claims priority to U.S. Provisional Patent Application No. 62/357,570, entitled "Dynamic Effective Radiated Power (ERP) Adjustment," and filed on Jul. 1, 2016, the disclosures of which are hereby incorporated herein by reference in their entirety.

TECHNICAL FIELD

The present disclosure describes a means to continuously adjust the dynamic range of a station based on location, attitude (roll, pitch, yaw), and antenna characteristics, such that the instantaneous maximum output power available to the station corresponds to the regulatory or coordinated effective isotropic radiated power (EIRP) spectral density limit.

BACKGROUND

For certain types of stations such as earth stations aboard aircraft (ESAA), for example, transmission towards a satellite (or ground-based stations) is limited by off-axis effective isotropic radiated power (EIRP) spectral density (ESD). That is, to prevent interference with adjacent satellites or ground-based stations, earth stations aboard aircraft (ESAAs) must comply with limitations on off-axis ESD. These limitations, which are typically stated as a mask specifying a maximum allowable ESD at a given angular offset along the geostationary orbit (GSO) arc, may either be coordinated with the operators of the adjacent satellites or mandated by a regulatory authority. Some phased-array antennas, such as those used in ESAA systems, exhibit isogain contour ellipticity and gain variation as a function of elevation. Due to the unique requirements associated with the airborne environment, the antennas used on board aircraft for communications may have complex antenna patterns that may vary as the aircraft moves throughout a given coverage area. As a consequence, the variations of antenna gain result in ESD limits that vary as a function of scan angle, skew angle, and frequency.

Adaptive, time-division duplexed multiple access (aTDMA) air interfaces may vary the coding, modulation, and symbol rate of transmissions from an ESAA to accommodate changes in the prevailing channel conditions, and other substantial capacity benefits on the link from the aircraft to the serving satellite (the "inroute"). However, since aTDMA transmissions can vary in frequency, power, and bandwidth on very short timescales, they introduce significant complexities in the monitoring of the ESAA's instantaneous ESD.

Furthermore, another method to meet the ESD limit is to select a minimum ESD limit over all operating conditions (i.e., scan angles, skew angles, and frequencies) used to transmit toward a particular target, and to calculate an antenna power input level using this minimum ESD limit. Providing power to the antenna using this minimum ESD thus ensures that the ESAA will meet the ESD limit for all scan/skew angle combinations as the antenna gain varies. However, this method has proven to be inflexible because it limits transmission to below the ESD limit for other scan/skew combinations when, for example, an ESAA antenna exhibiting a variable gain is capable of transmitting at the ESD limit across other scan/skew angles but is otherwise limited by the power output calculated in accordance with the minimum ESD.

BRIEF SUMMARY

Stations, such as ESAAs, for example, may be utilized to supplement vehicle communications. For aircraft, ESAAs may be integrated with other aircraft components and provide wireless communication links between the aircraft and ground-based networks via communication with satellites and/or ground stations. Through communication with the ground-based networks, ESAAs may provide aircraft with various wireless connectivity services for the airline passengers and/or crew, such as Internet access, text messaging, Wi-Fi, etc.

To do so, the ESAA maintains one or more wireless links with various targets such as satellites and/or ground-based stations during flight. Similar to mobile device handoffs, the ESAA may switch communications with satellites and/or ground-based stations based upon network capacity, signal strength, and/or line-of-sight considerations, for example. To accomplish communications with different targets in this manner, ESAAs typically have one or more antennas that are configured to transmit and/or receive signals in accordance with a steerable beam pattern. This beam pattern may be controlled by one or more processors to electronically and/or mechanically steer the antenna towards a desired target.

However, as the antenna is steered towards a particular target while the aircraft moves throughout a given coverage area, the antenna gain may vary. For example, at a particular scan angle, $\phi$, the gain of an antenna used in an ESAA may vary with changes in the skew angle $\psi$, as a result of changing aircraft attitude. And this gain may further vary across a range of skew angles at a different scan angle. In other words, although the ESAA antenna may be steered towards various targets during flight, doing so results in variations in the antenna gain for different scan and skew angle combinations. The off-axis effective isotropic radiated power (EIRP) for an ESAA at a particular scan and skew angle is a function of antenna gain and the instantaneous antenna power input. Therefore, as the gain of the antenna varies with changes in scan and skew angle combinations, so does the EIRP.

Therefore, to compensate for these antenna gain variations while maintaining the regulatory or coordinated ESD, techniques are disclosed to dynamically adjust the instantaneous power fed to an antenna system that forms part of a station (e.g., an earth station aboard aircraft (ESAA)). Again, the EIRP is limited by a maximum ESD limit, which may be set by a regulatory agency such as the Federal Communications Commission (FCC), for example. Furthermore, a minimum ESD may be driven by system performance such that, at a selected minimum ESD, the corresponding EIRP yields an acceptable threshold throughput, for example. Thus, for a given system, the transmitted EIRP may vary between a minimum EIRP (in accordance with the minimum ESD) and a maximum EIRP (in accordance with the maximum ESD limit). To ensure that the antenna transmits at an optimum effective isotropic radiated power (EIRP), the antenna input power may be varied with changes in the antenna gain and the ESD limit for various new scan and skew angle combinations as a result of ESAA location, aircraft attitude, and antenna characteristics.

To accomplish this, navigational data from the aircraft may be leveraged to calculate a target scan and skew angle in the direction of a target satellite or ground-based station. Once these new target scan and skew angles are known, embodiments include calculating the corresponding ESD limit and instantaneous maximum output power available to the station for this new target scan and skew angle, as these metrics change as a function of scan and skew angle in accordance with the location, aircraft attitude, and characteristics of a particular antenna. And because the antenna input power required to maintain a particular EIRP is a function of both the ESD limit and the antenna gain at a particular scan and skew angle, the instantaneous antenna input power may be calculated once the ESD limit and antenna gain for this new target scan and skew angle are known. Therefore, as the steerable beam pattern is adjusted while the attitude of the aircraft changes as it moves throughout a given coverage area, embodiments include optimizing the transmitted EIRP by adjusting the instantaneous antenna power input to ensure that the transmitted EIRP is substantially equal to the maximum allowable EIRP over a range of scan and skew angles.

The amplifier instantaneous power output may be used to provide antenna input power, which may be measured to calculate the transmitted EIRP and used to verify that the transmitted EIRP is less than a maximum allowable transmitted EIRP based upon the ESD limit for the target scan angle and the target skew angle. In the event that the transmitted EIRP exceeds the maximum allowable transmitted EIRP, the amplifier instantaneous power output may be reduced accordingly.

Throughout the disclosure, the term "EIRP," or effective isotropic radiated power, is used as regulatory agencies typically use this terminology. However, it will be understood that the embodiments discussed herein may be modified to be applicable to any measurement of effective radiated power (ERP) in an antenna system. For example, the techniques described herein are equally applicable to systems that utilize an ideal dipole reference for an ERP calculation as opposed to an ideal isotropic radiator.

Furthermore, advantages will become more apparent to those of ordinary skill in the art from the following description of the preferred embodiments which have been shown and described by way of illustration. As will be realized, the present embodiments may be capable of other and different aspects, and their details are capable of modification in various respects. Accordingly, the drawings and description are to be regarded as illustrative in nature and not as restrictive.

The figures depict aspects of the present invention for purposes of illustration only. Alternate aspects of the structures and methods illustrated herein may be employed without departing from the principles of the invention described herein.

DETAILED DESCRIPTION

Figure 1:
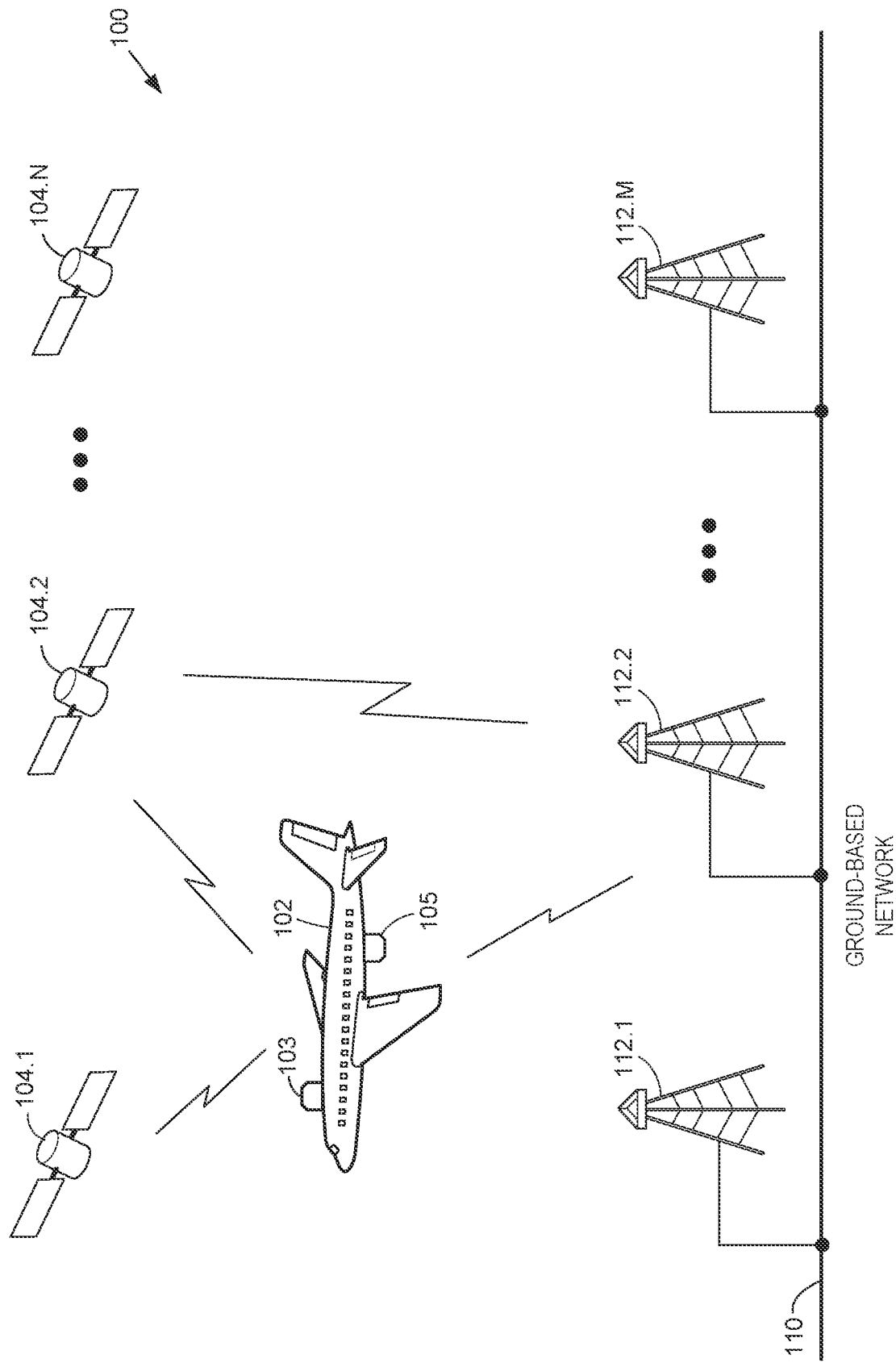
FIG. 1 illustrates an example communication system 100 in accordance with an embodiment of the present disclosure.

FIG. 1 illustrates an example communication system 100 in accordance with an embodiment of the present disclosure. In the present embodiments, communication system 100 may include a vehicle 102, any suitable number N of satellite communication systems 104.1-104.N, any suitable number M of ground-based stations 112.1-112.M, and a ground-based network 110. Communication system 100 may include additional, less, or alternate components, including those discussed elsewhere herein. Furthermore, for the sake of brevity, communication system 100 is illustrated as including a single vehicle 102. However, the aspects described herein may include any suitable number of such vehicles.

Vehicle 102 may include one or more stations 103 and/or 105, as shown in FIG. 1. Stations 103 and/or 105 may be mounted to, located within, or otherwise associated with vehicle 102 to facilitate communications between vehicle 102, one or more satellite communication systems 104.1-104.N, and/or one or more ground-based stations 112.1-112.M. In an embodiment, stations 103 and/or 105 may be implemented as respective ESAAs associated with the aircraft in which they are implemented, such as vehicle 102, for example. Although two stations 103 and 105 are shown in FIG. 1, embodiments include vehicle 102 implementing any suitable number of stations (e.g., one station or more than two).

Furthermore, the illustration provided in FIG. 1 is for illustrative purposes, as embodiments include stations 103 and/or 105 being mounted to any suitable portion of vehicle 102 such as, for example, beneath the vehicle, above the vehicle, etc. Furthermore, although vehicle 102 is shown in FIG. 1 as an aircraft, embodiments include stations 103 and/or 105 being implemented in any suitable type of vehicle in which a steerable antenna system may be implemented to facilitate communications, which may include airborne, land, and/or water-borne vehicles such as a space vehicle, a truck, a train, an automobile, a bus, a ship, a military vehicle, etc.

Vehicle 102 may utilize stations 103 and/or 105 to communicate with ground-based network 110 in any suitable manner to obtain various services provided by ground-based network 110 and to provide these services to passengers and/or crew of vehicle 102. For example, ground-based network 110 may provide vehicle 102 with connectivity to Internet services during flight such as email, streaming media, instant messaging, etc. These services may be provided to various computing devices located within vehicle 102, for example, via any suitable wired and/or wireless communication protocol, such as an IEEE 802.11 standard compliant protocol (e.g., Wi-Fi), for example.

In an embodiment, stations 103 and/or 105 may be configured to transmit and/or receive data in accordance with any suitable number and/or type of communication protocols to facilitate communications with one or more satellite communication systems 104.1-104.N and/or one or more ground-based stations 112.1-112.M. For example, as will be discussed further below with reference to FIG. 2, stations 103 and/or 105 may be implemented with any suitable combination of hardware and/or software to facilitate these functions such as, for example, one or more modems, upconverters, downconverters, amplifiers, processors, antennas, etc. In an embodiment, stations 103 and/or 105 may be configured to transmit and/or receive data in accordance with any suitable frequency or band of frequencies. For example, stations 103 and/or 105 may be configured to transmit and/or receive data in accordance with the Ku microwave band.

In various embodiments, ground-based network 110 may be configured to facilitate communications between stations 103 and/or 105 and/or one or more satellite communication systems 104.1-104.N using any suitable number of wireless links, as shown in FIG. 1. For example, ground-based network 110 may include any suitable number of nodes, additional wired and/or wireless networks that may facilitate one or more landline connections, internet service provider (ISP) backbone connections, satellite links, public switched telephone network (PSTN), etc. To provide additional examples, ground-based network 110 may be implemented as one or more local area networks (LANs), one or metropolitan area networks (MANs), one or wide area networks (WANs), or any suitable combination of local and/or external network connections.

To facilitate communications between stations 103 and/or 105 and/or one or more satellite communication systems 104.1-104.N, ground-based network 110 may be coupled to or otherwise communicate with one or more ground-based stations 112.1-112.M. In an embodiment, one or more ground-based stations 112.1-112.M may be implemented as cell sites that are configured to wirelessly communicate with other ground-based stations, stations such as stations 103 and/or 105, and/or satellites such as one or more satellite communication systems 104.1-104.N in accordance with any suitable number and/or type of communication protocols.

In other words, in various embodiments, one or more ground-based stations 112.1-112.M may function to facilitate the delivery of ground-based services via ground-based network 110 to vehicle 102 as part of an air-to-ground (ATG) network. In some embodiments, stations 103 and/or 105 may communicate with one or more ground-based stations 112.1-112.M to access the ground-based network. But in other embodiments, stations 103 and/or 105 may access the ground-based network via communications with one or more satellite communication systems 104.1-104.N, which in such a case function to facilitate communications between vehicle 102 and one or more ground-based stations 112.1-112.M.

One or more satellite communication systems 104.1-104.N may be configured to communicate with one or more stations (e.g., stations 103 and/or 105) and one or more ground-based stations 112.1-112.M in accordance with any suitable number and/or type of communications protocols. To accomplish this, one or more satellite communication systems 104.1-104.N may be in a geosynchronous or non-geosynchronous orbit.

In various embodiments, vehicle 102 may include one or more computing systems such as navigational systems, sensors, and/or other instruments that facilitate navigational guidance and provide feedback regarding the various vehicle dynamics that may be updated during a flight or other trip. These vehicle dynamics may include, for example, on-board navigational data to assist in piloting vehicle 102 to a particular destination and may indicate the current location of vehicle 102 in terms of latitude, longitude, altitude, and/or vehicle 102's current speed. Furthermore, the navigational data may include information regarding the heading, roll, pitch, and yaw of vehicle 102. To provide additional examples, the on-board navigational data may also include a latitude, longitude, and/or altitude of a particular target, such as one or more satellite communication systems 104.1-104.N and/or or one or more ground-based stations 112.1-112.M, for example, as further discussed below.

Vehicle 102 may also have one or more onboard computing systems that store data indicative of the geographic locations of one or more satellite communication systems 104.1-104.N and/or one or more ground-based stations 112.1-112.M. Vehicle 102 may utilize the navigational data to calculate a direction from stations 103 and/or 105 towards a particular target based upon the vehicle's current location and orientation in space as well as the known location of the target, such as one of satellite communication systems 104.1-104.N or one of ground-based stations 112.1-112.M, for example. Once this direction and orientation are known, a scan and skew angle may be calculated such that an antenna beam pattern may be steered towards the desired target.

However, in doing so, the antenna gain may increase or decrease from the previous scan and skew angle setting, thereby impacting the station's transmitted EIRP with changes in antenna beam pattern. If the power provided to the station's antenna is held constant as the scan and skew angles of the antenna beam pattern are adjusted, the transmitted EIRP may increase or decrease along with changes in the scan and skew angles.

Therefore, embodiments include stations 103 and/or 105 determining, for an updated scan and skew angle combination, an antenna gain and an EIRP spectral density (ESD) limit in accordance with the characteristics of the particular antenna used for signal transmission. Once these values are known, an antenna input power may be adjusted to compensate for these changes to ensure that the transmitted EIRP is maintained at a maximum level dictated by the ESD limit at the new scan and skew angle. The details of these calculations are provided below with reference to FIG. 2.

Figure 2:
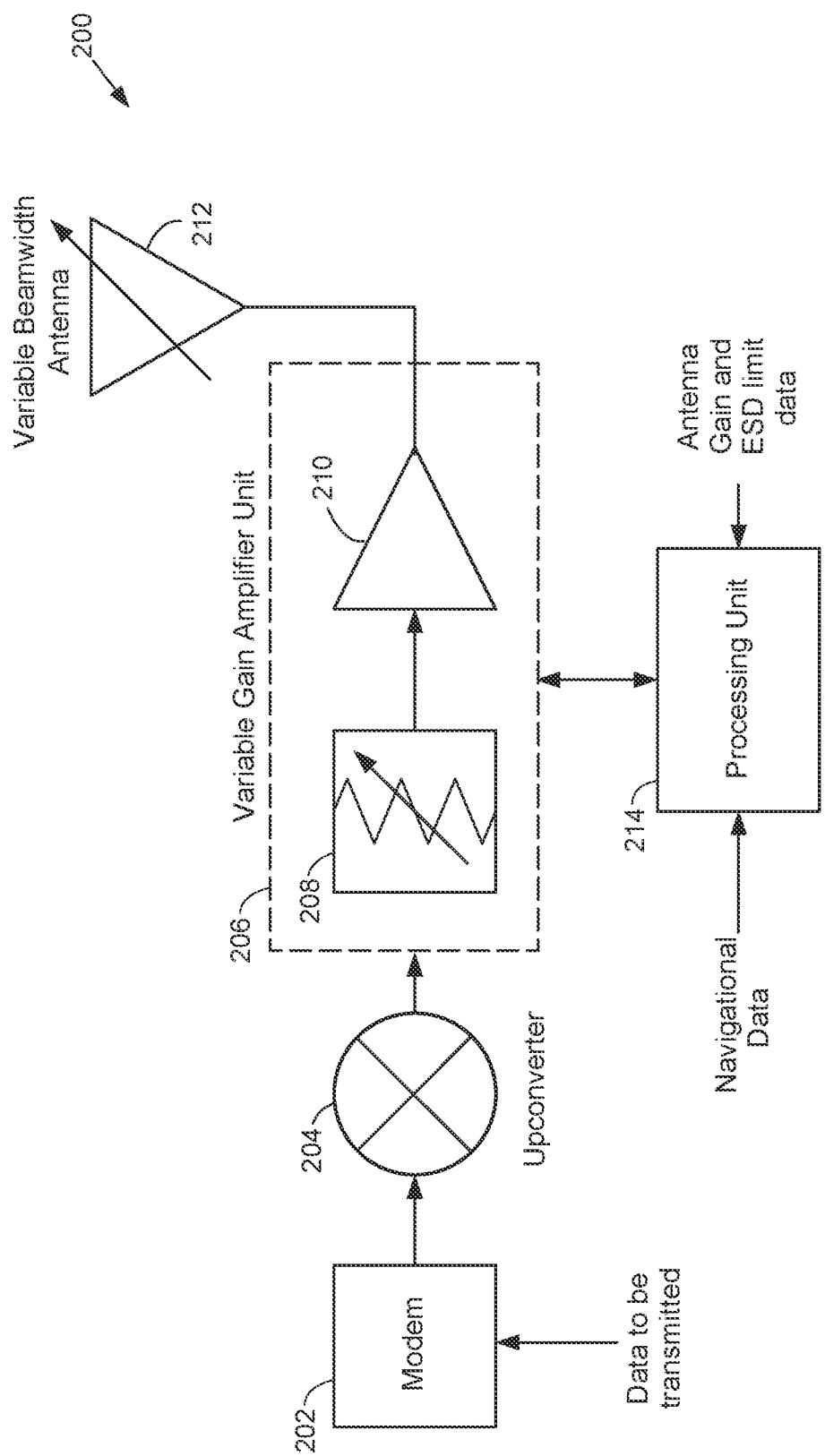
FIG. 2 illustrates a block diagram of a station 200 in accordance with an embodiment of the present disclosure.

FIG. 2 illustrates a block diagram of a station 200 in accordance with an embodiment of the present disclosure. In the present aspects, station 200 may include a modem 202, an upconverter 204, a variable gain amplifier unit 206, a variable beamwidth antenna 212, and a processing unit 214. Station 200 may include additional, less, or alternate components, including those discussed elsewhere herein. Furthermore, for the sake of brevity, the embodiments herein are generally described in accordance with station 200 performing transmission operations, and thus station 200 is illustrated and described as part of a radio frequency (RF) transmit chain. However, it will be understood that the embodiments described herein may be reciprocated to be applicable to RF receive chains. In accordance with such embodiments, some components of station 200 may be substituted for those implemented in accordance with an RF receive chain. For example, upconverter 204 may be substituted for a downconverter (or a downconverter may be used in parallel with upconverter 204) to facilitate RF receive chain embodiments.

Again, station 200 may be associated with any suitable type of vehicle, such as an aircraft, for example, by being mounted, integrated, or otherwise located in a vehicle. In an embodiment, station 200 may be an implementation of station 103 or 105, for example, as shown in FIG. 1. Furthermore, station 200 may be configured to communicate with one or more computing devices and/or sensors of the vehicle with which it is associated. For example, if station 200 is associated with an aircraft and implemented as an ESAA, station 200 may be wired into the aircraft's electrical system and/or be configured to transmit data to and/or receive data from other parts of the aircraft's computing systems. In an embodiment in which station 200 is associated with an aircraft, station 200 may be implemented, for example, as part of (or the entirety of) one or more line replaceable units (LRUs) and/or any other suitable combination of dedicated and/or shared aircraft components configured to transmit and/or receive data via variable beamwidth antenna 212, as discussed above with reference to FIG. 1.

In an embodiment, modem 202 may be configured to receive data signals from one or more data sources within the vehicle in which station 200 is associated and to modulate these data signals prior to upconversion by upconverter 204 and amplification by variable gain amplifier unit 206. These data signals may include, for example, part of data to be transmitted to one or more satellite communication systems and/or ground-based stations during vehicle operation (e.g., during flight). Again, when receiving data, modem 202 may facilitate the demodulation of downconverted signals, which is not shown in FIG. 2 for purposes of brevity.

Variable gain amplifier unit 206 may be configured to amplify the upconverted data signals from upconverter 204 in accordance with a variable gain and to provide these signals as input to variable beamwidth antenna 212 for transmission. Variable gain amplifier unit 206 may include, for example, a gain trim block 208 and an amplifier block 210. Variable gain amplifier unit 206 may be coupled to or otherwise communicate with processing unit 214, and processing unit 214 may set the gain trim of gain trim block 208 to adjust the instantaneous power output of variable gain amplifier unit 206. The instantaneous output power of variable gain amplifier unit 206, known herein as $P_{out}$, is essentially the same as the input power to variable beamwidth antenna 212, with the exception of any losses due to coupling between these two components.

In various embodiments, variable beamwidth antenna 212 may be implemented as any suitable type of antenna configured to transmit and/or receive data via a steerable beam pattern, which may be adjusted in accordance with any suitable type of beam steering techniques. In an embodiment, variable beamwidth antenna 212 may implement mechanical and/or electrical beam steering control via processing unit 214. For example, variable beamwidth antenna 212 may receive one or more data signals from processing unit 214 to cause mechanical and/or electrical changes in variable beamwidth antenna 212, thereby causing variable beamwidth antenna 212 to steer its transmitted beam pattern in a particular direction associated with a particular scan and skew angle combination. The embodiments described herein may be particularly useful, for example, when variable beamwidth antenna 212 is implemented as one or more antennas having a beamwidth with respect to a governing spectral mask that varies with location and/or orientation, such as phased array antennas, for example.

In various embodiments, processing unit 214 may be implemented as any suitable number and/or type of processors configured to receive, monitor, and/or process data and to control and execute various tasks and/or functions of one or more components of station 200. For example, processing unit 214 may be configured to receive navigational data (e.g., NavData, as furtherer discussed below) from the various vehicle components in which station 200 is associated. For example, the vehicle in which station 200 is implemented may utilize various communication systems, integrated navigational computers, storage components, LRUs, etc., which may be interconnected via one or more communication networks and constitute a portion of (or the entirety of) the vehicle's operational system. In an embodiment, station 200 may communicate with and/or otherwise interact with one or more components of the vehicle's operational system to facilitate one or more functions of the embodiments as described herein.

Again, this navigational data may include the current geographic coordinates of the vehicle associated with station 200 (e.g., in terms of latitude and longitude), the orientation of the vehicle (e.g., yaw, pitch, and roll), as well as the location of a particular target to which data should be sent and/or received (e.g., a satellite communication system or a ground-based station, as discussed above with respect to FIG. 1). Using this information, processing unit 214 may calculate a target scan and skew angle for variable beamwidth antenna 212 in a desired direction based upon the navigational data to cause variable beamwidth antenna to steer its beam pattern in that direction, thus compensating for changes in the location and orientation of the vehicle in which station 200 is located.

In an embodiment, processing unit 214 may be configured to reference one or more lookup tables (LUTs) that contain performance data related to variable beamwidth antenna 212. This performance data is further discussed below and may include, for example, the ESD limit and the antenna gain for variable beamwidth antenna 212 for various scan and skew angle combinations and/or operating frequencies. Processing unit 214 may access such LUTs via any suitable techniques, such as communications between processing unit 214 and one or more storage components located in the vehicle associated with station 200, which are not shown for purposes of brevity. To provide another example, processing unit 214 may include integrated storage to store these LUTs locally without having to communicate with other vehicle components. The data stored in these LUTs may be obtained, for example, by testing one or more variable beamwidth antennas 212 having similar design characteristics, such that the LUTs contain data corresponding to known or previously tested antenna performance parameters across an operating range of variable beamwidth antenna 212.

As discussed above, when steering the variable beamwidth antenna towards different targets, the different scan and skew angle combinations may cause the gain of variable beamwidth antenna 212 to vary, thus impacting the transmitted EIRP. To compensate for these gain variations, embodiments include processing unit 214 leveraging the navigational data to dynamically adjust the output power of variable gain amplifier unit 206. Furthermore, because the antenna gain and ESD limit are both considered when calculating the new output power level for a new scan and skew angle combination, the transmitted EIRP of variable beamwidth antenna 212 is maximized towards a particular target to meet but not exceed the ESD limit. The details of this technique are further discussed below.

In an embodiment, processing unit 214 initially sets the amplifier to an instantaneous maximum power $P_{out}$, which corresponds to transmission via variable beamwidth antenna 212 at the ESD limit. The output power is a function of the ESD limit and antenna gain at a particular scan and skew angle, for a given location and aircraft attitude, which is represented below as Eqn. 1.

$$P_{out}(\phi, \psi) = ESD(\phi, \psi) + 10\log_{10}\left(\frac{ksym/s}{4}\right) - G_{ant}(\phi, \psi) + K \quad \text{Eqn. 1}$$

Where:
ϕ: scan angle in degrees;
ψ: skew angle in degrees;
$P_{out}(\phi,\psi)$: is the amplifier instantaneous maximum allowable output power in dBW as a function of ϕ and ψ;
$ESD(\phi,\psi)$: is the EIRP spectral density limit in dBW/4 kHz as a function of ϕ and ψ;
ksym/s: is the modulated carrier rate in kilo-symbols per second;
$G_{ant}(\phi,\psi)$: is the variable antenna gain in dBi as a function of ϕ and ψ; and
K: is cable loss in dB from variable gain amplifier unit 206 to variable beamwidth antenna 212.

Eqn. 1, therefore, indicates the instantaneous maximum power amplifier output power needed to transmit at the ESD limit. In some cases of (ϕ,ψ), however, $P_{out}(\phi,\psi)$ will be limited by the rated output power $P_{rated}$, associated with variable gain amplifier unit 206.

In an embodiment in which station 200 is implemented in an aircraft and facilitates satellite data transmission and reception, navigational data (NavData) may be processed by processing unit 214 and include, for example, aircraft latitude (lat), aircraft longitude (long), satellite longitude (slong), aircraft roll (roll), aircraft pitch (pitch), and aircraft yaw (yaw). As processing unit 214 receives updated NavData during flight (e.g., every second, every two seconds, every five seconds, etc.), a new target scan and target skew angle, which is used to aim variable beamwidth antenna 212, $\phi^+$ and $\psi^+$, respectively, may be calculated along with the instantaneous power output of variable gain amplifier unit 206 for these updated target scan and skew angles, which is represented as $P_{out}^+(\phi^+,\psi^+)$. In other words, the target scan and skew angles $\phi^+$ and $\psi^+$ may be represented as functions of these NavData parameters, as shown below in Eqns. 2 and 3.

$$\phi^+ = \text{scan}(lat,long,slong,roll,pitch,yaw) \quad \text{Eqn. 2:}$$

$$\psi^+ = \text{skew}(lat,long,slong,roll,pitch,yaw) \quad \text{Eqn. 3:}$$

Referring back to Eqn. 1, an antenna gain LUT associated with $G_{ant}(\phi,\psi)$ may be stored as an M×N table of various antenna gains corresponding to various scan and skew angle combinations for variable beamwidth antenna 212. Similarly, an ESD limit LUT associated with $ESD(\phi,\psi)$ may be stored as an M×N table of various antenna gains corresponding to various scan and skew angle combinations for variable beamwidth antenna 212. In this way, once processing unit 214 calculates the target scan and skew angles $\phi^+$ and $\psi^+$, the antenna gain LUT and the ESD limit LUT may be referenced to calculate an instantaneous output power of variable gain amplifier $P_{out}^+(\phi^+,\psi^+)$ in accordance with Eqn. 1, by substituting $ESD(\phi,\psi)$ with $ESD(\phi^+,\psi^+)$ and $G_{ant}(\phi,\psi)$ with $G_{ant}(\phi^+,\psi^+)$.

The antenna gain LUT and the ESD limit LUT may store data in accordance with any suitable level of granularity. For example, antenna gain data and ESD limit data may be stored for every five degrees of scan and skew angle combinations, every one degree, etc. In accordance with various embodiments, processing unit 214 may determine whether the calculated target scan and skew angles $\phi^+$ and $\psi^+$ match entries stored in the antenna gain LUT and ESD limit LUT and, if a match is not found, processing unit 214 may perform bilinear interpolation to calculate $ESD(\phi^+,\psi^+)$ and $G_{ant}(\phi^+,\psi^+)$. This process is further described below with reference to FIG. 3.

Figure 3:
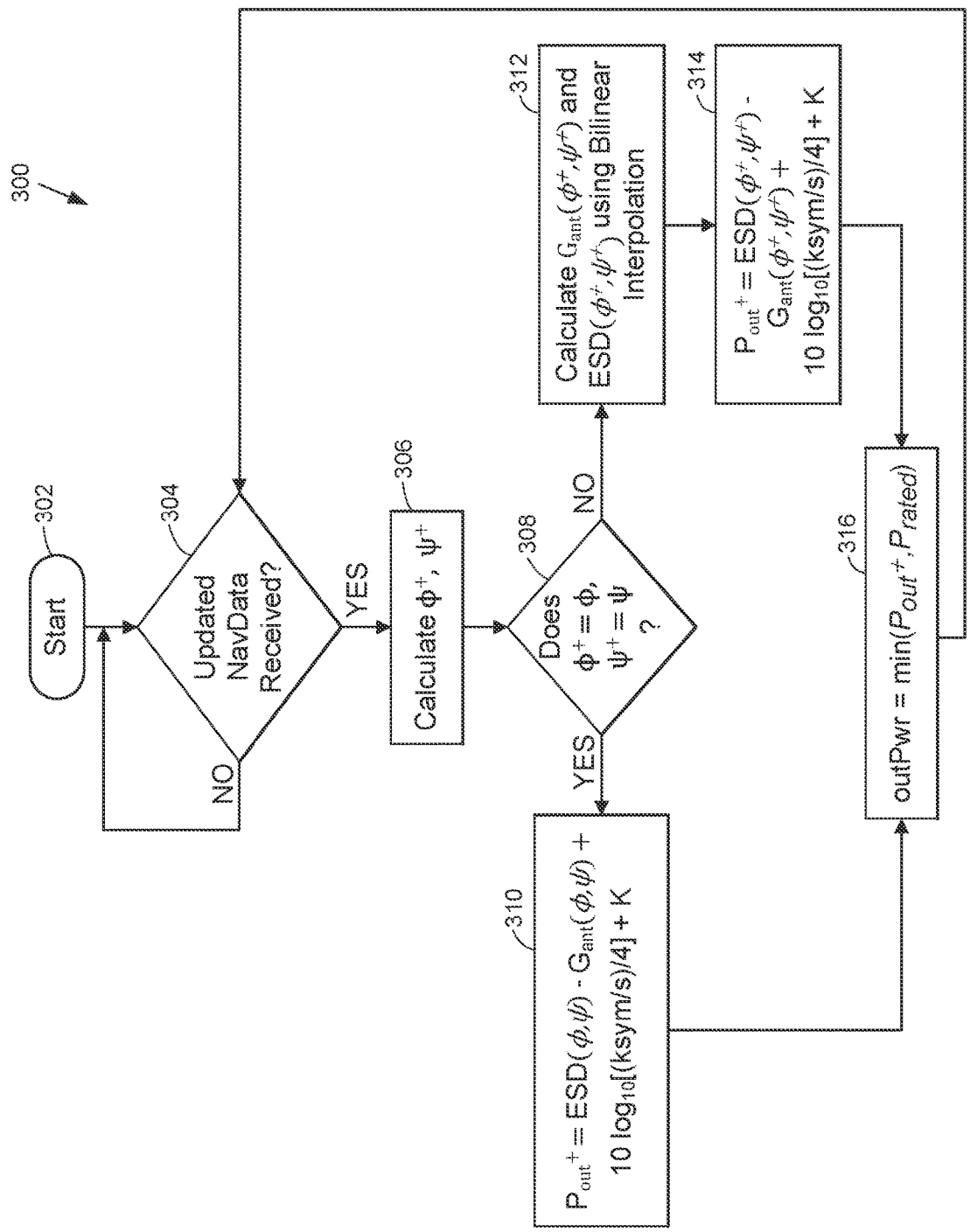
FIG. 3 illustrates a method flow 300 illustrating the amplifier instantaneous output power calculations for new target scan and skew angles in accordance with an embodiment of the present disclosure.

FIG. 3 illustrates a method flow 300 illustrating the amplifier instantaneous output power calculations for new target scan and skew angles in accordance with an embodiment of the present disclosure. Method flow 300 may be performed by any suitable number and/or type of processors. In an embodiment, method flow 300 may represent the calculation steps performed by processing unit 214, for example, as shown and described with reference to FIG. 2.

Method 300 may start when one or more processors initiates an EIRP adjustment procedure to adjust amplifier output power to compensate for differences in ESD limits and antenna gain with changes in scan and skew angles (block 302). For example, method 300 may begin when a vehicle is powered on or when a station is otherwise activated (block 302).

Method 300 may include one or more processors determining whether updated on-board navigational data (NavData) is received (block 304). This determination may be made, for example, via communications received from one or more vehicle components, as described above with reference to FIG. 2. For example, processing unit 214 may receive updated on-board NavData in accordance with a regularly recurring schedule (block 304). To provide another example, processing unit 214 may receive an indication represented by one or more data signals or other suitable communications that the on-board NavData has been updated (block 304). In any event, upon detecting that the on-board NavData has been updated, method 300 may proceed to calculate the target scan and skew angles $\phi^+$ and $\psi^+$ in accordance with Eqns. 2 and 3, as discussed above. Otherwise, method 300 may include maintaining the current amplifier power output and continuing to monitor communications until new updated on-board NavData is received (block 304).

Method 300 may include one or more processors calculating the target scan and skew angles $\phi^+$ and $\psi^+$ as a function of the NavData, as discussed above with respect to Eqns. 2 and 3 (block 306). This may include, for example, using the NavData to calculate the target scan and skew angles $\phi^+$ and $\psi^+$ based upon the orientation of the variable beamwidth antenna in space and a required direction towards a particular target based upon that target's identified location (block 306).

Once the target scan and skew angles $\phi^+$ and $\psi^+$ are calculated, method 300 may include one or more processors determining whether these target scan and skew angles $\phi^+$ and $\psi^+$ match scan and skew angles stored in an antenna gain LUT and an ESD limit LUT (block 308). This determination may be made in accordance with any suitable techniques (block 308). For example, method 300 may include processing unit 214 determining whether target scan and skew angles $\phi^+$ and $\psi^+$ match the scan and skew angles stored in the antenna gain LUT and the ESD limit LUT within a threshold tolerance (e.g., 1%, 5%, etc.), thus yielding a "match" when this condition is satisfied (block 308). To provide another example, method 300 may include processing unit 214 determining whether target scan and skew angles $\phi^+$ and $\psi^+$ match the scan and skew angles stored in each of antenna gain LUT and ESD limit LUT by rounding and/or truncating the target scan and skew angles $\phi^+$ and $\psi^+$. For example, after rounding or truncating, the rounded or truncated target scan and skew angles $\phi^+$ and $\psi^+$ may then correspond directly to the scan and skew angles stored in antenna gain LUT and ESD limit LUT, thereby resulting in a match (block 308).

Regardless of how this comparison is made and what constitutes a match, if a match for the target scan and skew angles $\phi^+$ and $\psi^+$ is found in the antenna gain LUT and the ESD limit LUT (block 308), then method 300 may proceed to use these values for the amplifier power output calculations in accordance with Eqn. 1, for example (block 310).

Method 300 may include one or more processors calculating the target amplifier instantaneous power output $P_{out}^+$($\phi^+$,$\psi^+$) in accordance with Eqn. 1, for example, as discussed above (block 310). This may include, for example, processing unit 214 calculating ESD($\phi^+$,$\psi^+$) and $G_{ant}$($\phi^+$,$\psi^+$) from their matching entries in the ESD limit LUT and the antenna gain LUT, respectively, for the LUT scan and skew angles that correspond to the matching target scan and skew angles $\phi^+$ and $\psi^+$ (block 310).

However, if a match is not found for the target scan and skew angles $\phi^+$ and $\psi^+$ in either the ESD limit LUT or the antenna gain LUT (block 308), then method 300 may include processing unit 214 calculating ESD($\phi^+$,$\psi^+$) and/or $G_{ant}$($\phi^+$,$\psi^+$) in accordance with bilinear interpolation (block 312). For example, the ESD limit LUT may be represented as a two-dimensional M×N table, with M and N being associated with ranges of scan and skew angles, respectively (or vice-versa). The cells in the ESD limit LUT may also have ESD limit values for different intersecting combinations of scan and skew angles. The antenna gain LUT may be similarly represented, except that the antenna gain LUT may contain different antenna gain values for different intersecting combinations of scan and skew angles.

Therefore, method 300 may include calculating $G_{ant}$($\phi^+$, $\psi^+$) using bilinear interpolation in accordance with the two variables $\phi^+$ and $\psi^+$. Specifically, the values for $G_{ant}$($\phi^+$,$\psi^+$) may be calculated from the two closest $\phi$ (left and right) in the antenna gain LUT, the two closest $\psi$ (top and bottom) in the antenna gain LUT, and their corresponding antenna gain values (block 312).

Similarly, method 300 may include calculating ESD($\phi^+$, $\psi^+$) using bilinear interpolation in accordance with the two variables $\phi^+$ and $\psi^+$. Specifically, the values for ESD($\phi^+$,$\psi^+$) may be calculated from the two closest $\phi$ (left and right) in the ESD limit LUT, the two closest $\psi$ (top and bottom) in the ESD limit LUT, and their corresponding antenna ESD limit values (block 312).

Once $G_{ant}$($\phi^+$, $\psi^+$) and ESD($\phi^+$,$\psi^+$) are calculated, method 300 may include one or more processors calculating the target amplifier instantaneous power output $P_{out}^+$($\phi^+$,$\psi^+$) in accordance with Eqn. 1, as discussed above (block 314). This may include, for example, processing unit 214 utilizing the previously calculated ESD($\phi^+$,$\psi^+$) and $G_{ant}$($\phi^+$,$\psi^+$) via bilinear interpolation (block 312) in accordance with Eqn. 1 (block 314).

Once $P_{out}^+$($\phi^+$,$\psi^+$) is calculated, method 300 may include one or more processors calculating the output power of the variable gain amplifier that is coupled to the variable beamwidth antenna as the lesser of the calculated Pit (block 310, 314) or the rated output power, $P_{rated}$, associated with variable gain amplifier (block 316). Once the output power of the variable gain amplifier is set, method 300 may include maintaining the current amplifier power output and continuing to monitor communications until new updated NavData is received (block 304). In this way, a maximum transmitted EIRP may be maintained over a range of scan and skew angles without exceeding the rated amplifier power.

In an embodiments, once the amplifier output power is calculated, which may be done in accordance with method 300 discussed above, for example, processing unit 214 may measure the target amplifier power output. For example, variable gain amplifier unit 206 may have any suitable number of attenuators or taps to facilitate this measurement. To provide another example, processing unit 214 may obtain this data from communications with various instruments, sensors, and/or computing devices associated with the vehicle in which station 200 is located (e.g., the operational system of the vehicle, as discussed above). Once this power is determined, processing unit 214 may use this information as feedback to calculate the transmitted EIRP, and to verify that the transmitted EIRP is less than a maximum transmitted EIRP based upon the ESD limit for the target scan angle and the target skew angle.

In other words, processing unit 214 may calculate a gain associated with gain trim block 208, which should result in the desired power output level from variable gain amplifier unit 206. However, nonlinearities of the amplifier, errors introduced using bilinear interpolation, manufacturing tolerances among different tested variable beamwidth antennas, or other extraneous factors may result in the transmitted EIRP of variable beamwidth antenna 212 differing from the calculated transmitted EIRP in accordance with the calculated amplifier power output. Therefore, by monitoring the actual amplifier power output, processing unit 214 may determine whether the transmitted EIRP has exceeded the maximum allowable EIRP for a particular scan and skew angle combination. If so, processing unit 214 may further reduce the calculated output power via gain trim block 208 to ensure that the maximum EIRP limit is not exceeded.

Figure 4A:
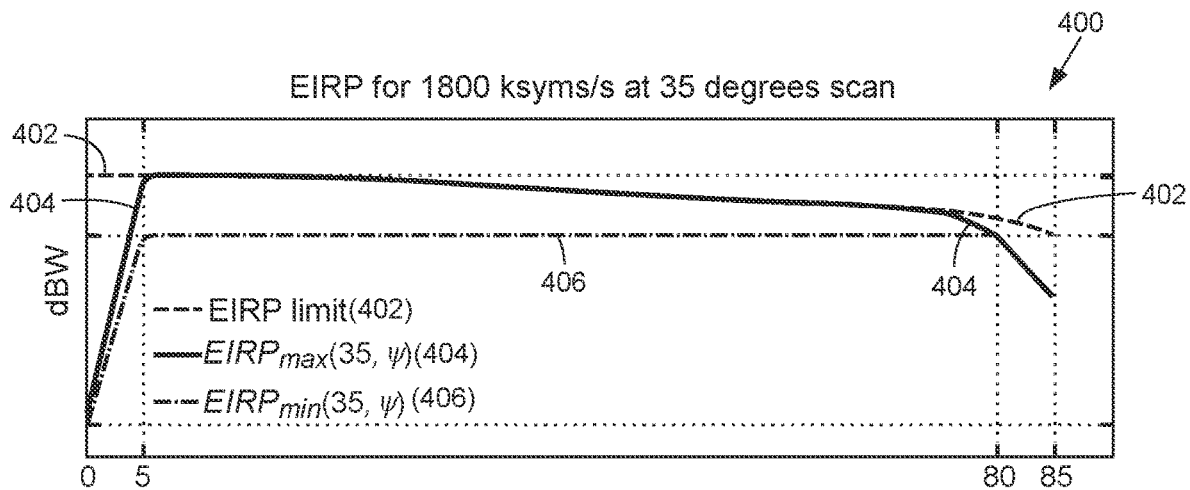
FIG. 4A illustrates an example plot 400 showing changes in the effective isotropic radiated power (EIRP) limit, EIRP maximum, and EIRP minimum over a range of skew angles for a constant scan angle, in accordance with an embodiment of the present disclosure.

FIG. 4A illustrates an example plot 400 showing changes in the effective isotropic radiated power (EIRP) limit, EIRP maximum, and EIRP minimum over a range of skew angles for a constant scan angle in accordance with an embodiment of the present disclosure. FIG. 4A illustrates performance enhancement as a result of the embodiments described herein, in which amplifier output power is adjusted as the variable beamwidth antenna is steered across varying skew angles ranging between 0 and 85 degrees while the scan angle is held constant at 35 degrees.

The curves in plot 400 represent the changes in EIRP as a function of skew angle at a 35 degree scan angle, which may be represented as EIRP(35,$\psi$). The EIRP curves shown in plot 400 are derived from Eqn. 4 below.

$$(\phi, \psi) = ESD(\phi, \psi) + 10\log_{10}\left(\frac{\text{symbol rate}}{4 \text{ kHz}}\right) \quad \text{Eqn. 4}$$

Thus, the EIRP curves shown in plot 400 correspond to an EIRP calculated in accordance with different ESD values. EIRP curve 402 is associated with the maximum EIRP limit in accordance with the maximum ESD limit value. EIRP curve 406, on the other hand, shows the result of utilizing the minimum ESD limit to guarantee that the EIRP does not exceed the EIRP limit represented by EIRP curve 402 over the range of skew angles. As shown in FIG. 4A, as a result of the power output selection, EIRP curve 406 is close to but does not exceed the maximum EIRP curve at the lower range of skew angles (e.g., less than 5 degrees). The use of the minimum ESD at the lower skew angle range therefore results in a lower EIRP at higher skew angles.

The EIRP curve 404 represents the EIRP resulting from adjusting amplifier output power in accordance with Eqn. 1 and method 300, as discussed above. In other words, EIRP curve 404 indicates that because the amplifier power output is calculated using the maximum ESD limit value through the range of skew angles, that the transmitted EIRP substantially matches that of the EIRP limit curve 402. For example, with reference to FIG. 4A, at a point (35,20), the difference between EIRP curve 404 and EIRP curve 406 translates to approximately a 30% increase in EIRP, which is the result of evaluating $10^{(-5.2/10)}=30.2\%$. That is, because the EIRP curve 404 is changing across skew angles, the difference between EIRP curve 404 and EIRP curve 406 also changes across skew angles. This increase in EIRP advantageously allows for faster data throughput that would not otherwise be possible without the embodiments described herein.

FIG. 4A therefore illustrates that the adjustments to the variable gain of the variable gain amplifier unit 206 result in transmitting at an EIRP substantially equal to the maximum transmitted EIRP based upon the ESD limit over the range of scan and skew angles (EIRP curve 404), without exceeding the maximum allowable transmitted EIRP (EIRP curve 402).

Figure 4B:
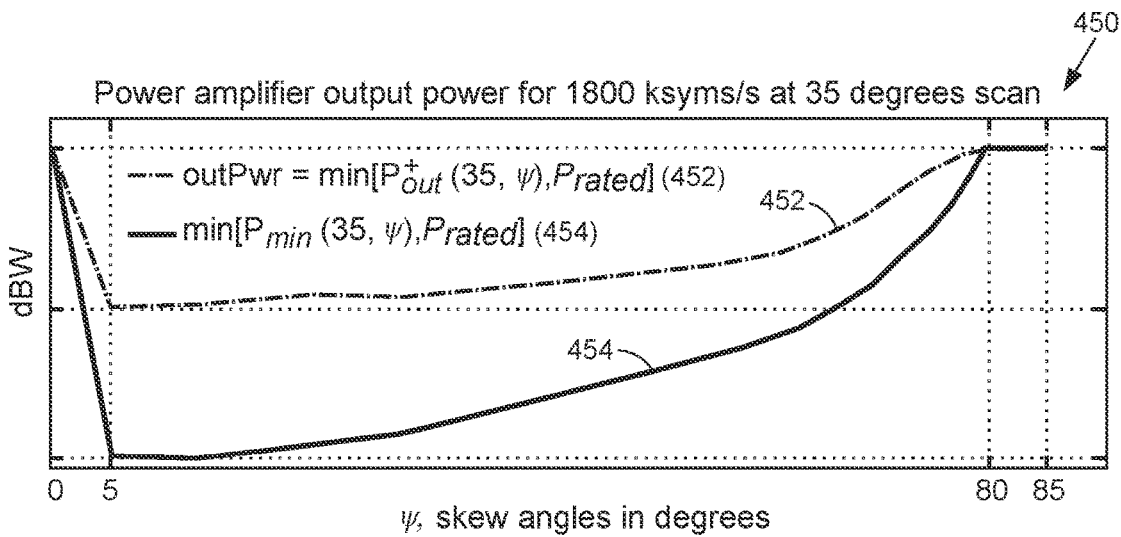
FIG. 4B illustrates an example plot 450 showing changes in the amplifier instantaneous output power over a range of skew angles for a constant scan angle, in accordance with an embodiment of the present disclosure.

FIG. 4B illustrates an example plot 450 showing changes in the amplifier instantaneous output power over a range of skew angles for a constant scan angle, in accordance with an embodiment of the present disclosure. Similar to FIG. 4A, FIG. 4B shows data corresponding to a 35 degree scan angle for skew angles varying between 0 and 85 degrees. Amplifier power output curve 452 corresponds to the adjusted amplifier output in accordance with the embodiments described herein. For example, amplifier power output curve 452 indicates that outPwr is the lesser of the calculated $P_{out}^+$, or the rated output power $P_{rated}$, for skew angles ranging between 0 and 85 degrees, as discussed above with respect to method 300. Amplifier power output curve 452, therefore, may represent the amplifier power output corresponding to the EIRP curve 404, as shown in FIG. 4A.

Amplifier power output curve 454, however, corresponds to the amplifier output associated with the lesser of the amplifier minimum output power corresponding to the minimum ESD power or the rated output power $P_{rated}$ for skew angles ranging between 0 and 85 degrees. Amplifier power output curve 454, therefore, may represent the amplifier power output corresponding to the EIRP curve 406, as shown in FIG. 4A. FIG. 4B therefore clearly illustrates the adjustments to amplifier power output over a wide range of skew angles, resulting in the increased EIRP as discussed above with respect to FIG. 4A.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. An apparatus comprising:
    a variable beamwidth antenna configured to transmit in accordance with one or more beam patterns;
    a variable gain amplifier unit coupled to the variable beamwidth antenna; and
    a processing unit coupled to the variable gain amplifier unit, and configured to
        determine a beam pattern towards a target station,
        determine a gain of the variable gain amplifier based upon the beam pattern and an effective isotropic radiated power (EIRP) spectral density (ESD) limit, and
    adjust a gain of the variable gain amplifier unit to the determined gain.

2. The apparatus of claim 1, wherein determining the beam pattern includes determining a target scan angle and a target skew angle.

3. The apparatus of claim 1, wherein a gain of the variable beamwidth antenna changes with changes in the beam pattern, and wherein the processing unit is configured to determine a target instantaneous power output of the variable gain amplifier that corresponds to the ESD limit based upon the ESD limit and based upon a gain of the variable beamwidth antenna that corresponds to the beam pattern.

4. The apparatus of claim 3, wherein the variable gain amplifier unit includes a gain trim block and an amplifier block, and wherein the processing unit is configured to adjust a gain trim of the gain trim block based upon the ESD limit and based upon the gain of the variable beamwidth antenna that corresponds to the beam pattern so as to cause the gain of the variable gain amplifier unit to be adjusted to set an instantaneous power output of the variable gain amplifier unit to a target instantaneous power output.

5. The apparatus of claim 3, wherein the processing unit is configured to:
    determine the ESD limit using an ESD limit lookup table (LUT) based upon the beam pattern; and
    determine the gain of the variable beamwidth antenna using an antenna gain LUT based upon the beam pattern.

6. The apparatus of claim 1, wherein the processing unit is further configured to:
    measure an instantaneous power output of the variable gain amplifier unit;
    determine a transmitted EIRP associated with the variable beamwidth antenna based upon the measured instantaneous power output;
    determine whether the transmitted EIRP is greater than a maximum transmitted EIRP based upon the ESD limit; and
    further adjust the gain of the variable gain amplifier unit when the transmitted EIRP is greater than the maximum transmitted EIRP.

7. The apparatus of claim 1, wherein the processing unit is further configured to:
    detect a change in location or orientation relative to the target station;
    in response to detecting the change, determine an updated beam pattern towards the target station;
    determine, based upon the updated beam pattern and an updated ESD limit, an updated gain of the variable gain amplifier; and
    further adjust the gain of the variable gain amplifier unit to the updated gain.

8. The apparatus of claim 1, wherein the apparatus is configured to operate on a vehicle, and wherein the processing unit is configured to determine the beam pattern based upon at least one of (i) a latitude of the vehicle, (ii) a longitude of the vehicle, (iii) an altitude of the vehicle, (iv) a latitude of the target station, (v) a longitude of the target station, (vi) an altitude of the target station, (vii) a roll orientation of the vehicle, (viii) a pitch orientation of the vehicle, or (ix) a yaw orientation of the vehicle.

9. The apparatus of claim 1, wherein the apparatus is configured to operate on at least one of an airborne vehicle, a land vehicle, a water-borne vehicle, or a space vehicle.

10. A method, comprising:
    determining, by a processing unit, a beam pattern of a variable beamwidth antenna towards a target station;
    determining, by the processing unit, a gain of a variable gain amplifier coupled to the variable beamwidth antenna based upon the beam pattern and an effective isotropic radiated power (EIRP) spectral density (ESD) limit; and
    adjusting, by the processing unit, a gain of the variable gain amplifier to the determined gain.

11. The method of claim 10, wherein determining the beam pattern towards the target station includes determining a target scan angle and a target skew angle.

12. The method of claim 11, further comprising determining, by the processing unit, a target instantaneous power output that corresponds to the ESD limit based upon a gain of the variable beamwidth antenna that corresponds to the beam pattern.

13. The method of claim 12, further comprising:
    determining, by the processing unit, the ESD limit using an ESD limit lookup table (LUT); and
    determining, by the processing unit, the gain of the variable beamwidth antenna using an antenna gain LUT.

14. The method of claim 10, further comprising:
    measuring an instantaneous power output of the variable gain amplifier unit;
    determining, by the processing unit, a transmitted EIRP associated with the variable beamwidth antenna based upon the instantaneous power output;
    determining, by the processing unit, whether the transmitted EIRP is less than a maximum transmitted EIRP based upon the ESD limit; and
    causing, by the processing unit, the gain of the variable gain amplifier unit to be further adjusted when the transmitted EIRP is greater than the maximum transmitted EIRP.

15. The method of claim 10, further comprising:
    detecting a change in location or orientation relative to the target station;
    in response to detecting the change, determining, by the processing unit, an updated beam pattern towards the target station;
    determining, by the processing unit, an updated gain of the variable gain amplifier based upon the updated beam pattern and an updated ESD limit; and
    adjusting, by the processing unit, the gain of the variable gain amplifier unit to the updated gain.

16. The method of claim 10, wherein the variable beamwidth antenna is located on a vehicle, and wherein determining the beam pattern is based upon at least one of (i) a latitude of the vehicle, (ii) a longitude of the vehicle, (iii) an altitude of the vehicle, (iv) a latitude of the target station, (v) a longitude of the target station, (vi) an altitude of the target station, (vii) a roll orientation of the vehicle, (viii) a pitch orientation of the vehicle, or (ix) a yaw orientation of the vehicle.

17. The method of claim 10, wherein a gain of the variable beamwidth antenna changes with changes in the beam pattern, and further comprising determining, by the processing unit, a target instantaneous power output that corresponds to the ESD limit based upon a gain of the variable beamwidth antenna that corresponds to the beam pattern.

18. The method of claim 10, wherein the variable beamwidth antenna is configured to operate on at least one of an airborne vehicle, a land vehicle, a water-borne vehicle, or a space vehicle.

19. A non-transitory, machine-readable medium storing instructions that, when executed by a processor, cause a system to:
    determine a beam pattern towards a target station;
    determine an amplifier gain based upon the beam pattern and an effective isotropic radiated power (EIRP) spectral density (ESD) limit;
    configure a variable beamwidth antenna to transmit in accordance with the beam pattern; and
    adjust a gain of a variable gain amplifier unit coupled to the variable beamwidth antenna to the determined gain.

20. The non-transitory, machine-readable medium of claim 19, wherein the system is configured to operate on at least one of an airborne vehicle, a land vehicle, a waterborne vehicle, or a space vehicle.

* * * * *